United States Patent
Kabata

(10) Patent No.: US 11,618,245 B2
(45) Date of Patent: Apr. 4, 2023

(54) METALLIC PAPER, PRINTED MATTER, AND IMAGE FORMING METHOD

(71) Applicant: Toshiyuki Kabata, Kanagawa (JP)

(72) Inventor: Toshiyuki Kabata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/352,772

(22) Filed: Jun. 21, 2021

(65) Prior Publication Data

US 2022/0009210 A1 Jan. 13, 2022

(30) Foreign Application Priority Data

Jul. 10, 2020 (JP) .............................. JP2020-119331

(51) Int. Cl.
*B32B 27/10* (2006.01)
*G03G 15/01* (2006.01)
*B32B 7/023* (2019.01)
*B32B 7/12* (2006.01)
*B32B 27/36* (2006.01)
(Continued)

(52) U.S. Cl.
CPC .............. *B32B 27/10* (2013.01); *B32B 7/023* (2019.01); *B32B 7/12* (2013.01); *B32B 27/36* (2013.01); *B32B 29/06* (2013.01); *G03G 13/013* (2013.01); *G03G 15/0131* (2013.01); *B32B 2255/10* (2013.01); *B32B 2255/12* (2013.01); *B32B 2255/205* (2013.01); *B32B 2307/406* (2013.01); *B32B 2554/00* (2013.01)

(58) Field of Classification Search
CPC ............ B32B 27/10; B32B 7/023; B32B 7/12; B32B 27/36; B32B 29/06; B32B 2255/10; B32B 2255/12; B32B 2255/205; B32B 2307/406; B32B 2554/00; G03G 13/013; G03G 15/0131
See application file for complete search history.

(56) References Cited

U.S. PATENT DOCUMENTS

2009/0232541 A1* 9/2009 Hatakeyama .......... G03G 15/75
399/111
2015/0370206 A1 12/2015 Hitosugi et al.
2016/0154345 A1 6/2016 Nagata
(Continued)

FOREIGN PATENT DOCUMENTS

JP 61-215793 9/1986
JP 5555997 B2 * 7/2014 ............. G03G 15/75
(Continued)

*Primary Examiner* — Ryan D Walsh
(74) *Attorney, Agent, or Firm* — Grüneberg and Myers, PLLC

(57) ABSTRACT

Metallic paper for electrophotography is provided. The metallic paper comprises a substrate, a metallic luster layer over the substrate, and a polyester at a surface of the metallic paper. A ratio B/A is 0.90 or less, where A and B respectively represent peak area A and a peak area B in an infrared spectrum of the metallic paper obtained by an ATR method with a crystal of Ge, an incident angle of 45°, and one time of reflection. The wavenumber range of peak area A ranges from 1709.586 to 1741.406 cm$^{-1}$, the wavenumber range of peak area. B ranges from 1630,519 to 1670.052 cm$^{1}$, and a baseline wavenumber range of the peaks ranges from 1593.878 to 1850.364 cm$^{-1}$.

17 Claims, 3 Drawing Sheets

(51) Int. Cl.
   *B32B 29/06*   (2006.01)
   *G03G 13/01*   (2006.01)

(56)  References Cited

U.S. PATENT DOCUMENTS

| | | | |
|---|---|---|---|
| 2018/0024462 A1 | 1/2018 | Shimada et al. | |
| 2020/0050144 A1 | 2/2020 | Kabata et al. | |
| 2020/0301328 A1 | 9/2020 | Kabata et al. | |

FOREIGN PATENT DOCUMENTS

| | | |
|---|---|---|
| JP | 2016-021037 | 2/2016 |
| JP | 2016-102909 | 6/2016 |
| JP | 2016-139001 | 8/2016 |
| JP | 2018-136514 | 8/2018 |
| JP | 2020-154079 | 9/2020 |
| WO | WO-2021180651 A1 * | 9/2021 |

\* cited by examiner

METALLIC PAPER, PRINTED MATTER, AND IMAGE FORMING METHOD

CROSS-REFERENCE TO RELATED APPLICATIONS

This patent application is based on and claims priority pursuant to 35 U.S.C. § 119(a) to Japanese Patent Application No. 2020-119331, filed on Jul. 10, 2020, in the Japan Patent Office, the entire disclosure of which is hereby incorporated by reference herein.

BACKGROUND

Technical Field

The present disclosure relates to metallic paper, printed matter, and an image forming method.

Description of the Related Art

In the field of printing, printed matter made by printing images on metallic paper have been used for posters, book covers, packages, product tags, various cards, and POP advertisements, and furniture on display shelves, for the purpose of making the printed matter stand out. These images have a very high impact and a high advertising effect because the non-image part shines glaringly or brilliantly.

Images on metallic paper are often created by offset printing. Offset printing is suitable for high-volume printing but is not suitable for low-volume printing in terms of cost. Because the cost of metallic paper itself is high, images on metallic paper are often demanded in low-volume printing (i.e., 100 sheets or less) rather than high-volume printing.

One example of image forming methods for low-volume printing involves electrophotography. However, currently, electrophotography is rarely used in forming images on metallic paper. One reason for this arises from the characteristics of the image formed on metallic paper. When an image having a large area is formed on metallic paper only with cyan (C), magenta (M), yellow (Y), and black (K) colors, the image becomes dark without becoming an impactful image. This phenomenon can be avoided when a white image is present as the lowermost layer of the image. However, an electrophotographic image forming device generally forms images with four color toners (C, M, Y, and K) and is not able to print a white image as the lowermost layer.

On the other hand, recently, industrial electrophotographic image forming apparatuses equipped with white toner in addition to four colored toners (C, M, Y. and K) have been put into practical use, which makes it possible to form images on metallic paper.

SUMMARY

In accordance with some embodiments of the present invention, metallic paper for electrophotography is provided. The metallic paper comprises a substrate, a metallic luster layer over the substrate, and a polyester at a surface of the metallic paper. A ratio B/A is 0.90 or less, where A and B respectively represent a peak area A and a peak area B in an infrared spectrum of the metallic paper obtained by an ATR method with a crystal of Ge, an incident angle of 45°, and one time of reflection. The wavenumber range of peak area A ranges from 1709.586 to 1741.406 $cm^{-1}$, the wavenumber range of peak area B ranges from 1630.519 to 1670.052 $cm^{-1}$, and a baseline wavenumber range of the peaks ranges from 1593.878 to 1850.364 $cm^{-1}$.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
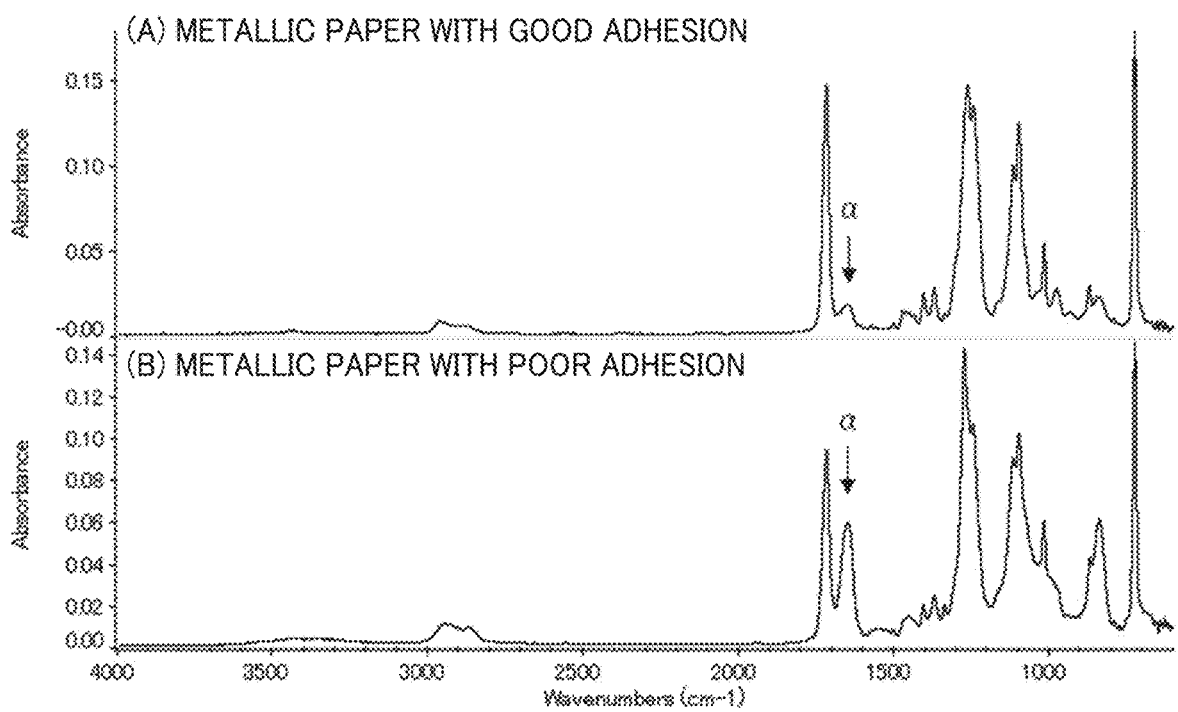
FIG. 1 are graphs (A) and (B) showing infrared ("IR") spectra of metallic paper according to an embodiment of the present invention and comparative metallic paper, respectively.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to an embodiment of the present invention, metallic paper is provided that has excellent adhesion to images formed by electrophotography.

Hereinafter, metallic paper, printed matter, and an image forming method according to some embodiments of the present invention are described with reference to the drawings. Incidentally, it is to be noted that the following embodiments are not limiting the present invention and any deletion, addition, modification, change, etc. can be made within a scope in which person skilled in the art can conceive including other embodiments, and any of which is included within the scope of the present invention as long as the effect and feature of the present invention are demonstrated.

The metallic paper is generally composed of coated paper and a plastic film having a metal layer on one side, bonded to each other. As the plastic film, a polyester film has been mainly used. On the other hand, toner generally contains a binder resin such as polyester resin and styrene resin. Such a binder resin is compatible with polyester. Therefore, the toner image having been melted with a sufficient amount of heat will exhibit good adhesion to the metallic paper.

However, most commercially-available metallic paper exhibits poor adhesion to a toner image formed by electrophotography, and the toner image is easily detached from the metallic paper when rubbed. Such metallic paper cannot be put into practical use. In particular, metallic paper which has been widely used in offset printing tends to have poor adhesion to toner. In the worst case, the toner image peels off in a film shape just by application of vibration. In the case of metallic paper having extremely poor adhesion, the toner image often peels off in a film shape even though the toner has been sufficiently melted.

Based on an assumption that some layer is present at the surface of the metallic paper, the inventors of the present invention observed a cross-section of the metallic paper having extremely poor adhesion to toner using an electron microscope. As a result, no layer was clearly observed at the surface.

The inventors of the present invention attempted to form images on several types of commercially-available metallic paper by electrophotography and found that there are some types of metallic paper which can possibly improve adhesion to toner images.

Based on an assumption that there is some differences between metallic paper which can possibly improve adhesion to toner images and metallic paper which has poor adhesion to toner images, the inventors of the present invention measured IR spectra of the outermost surfaces thereof by an Attenuated Total Reflection ("ATR") method (with a crystal of Ge, an incident angle of 45°, and one time of reflection). The measured IR spectra were searched by a search function of an IR spectrum analysis software program OMNIC (product of Thermo Fisher Scientific K.K.). As a result, polyester was a hit in all the IR spectra. As a result of detailed comparison between the IR spectra, the metallic paper having poor adhesion to toner images was found to have a peak at 1,650 cm$^{-1}$.

In FIG. 1, a graph (A) showing an IR spectrum of metallic paper having good adhesion to toner and a graph (B) showing an IR spectrum of metallic paper having poor adhesion to toner. First, the graph (B) showing an IR spectrum of metallic paper which does not fall within the scope of the present invention is described in detail below. As a result of diligent studies, the inventors have found that the adhesion of metallic paper to toner images is more improved as the peak at 1,650 cm$^{-1}$ ("α" in FIG. 1) becomes smaller.

It is not clear why the peak exists at 1,650 cm$^{-1}$. However, major metallic paper used in offset printing tend to have a large peak at 1,650 cm$^{-1}$ maybe for some favorable reasons. There is a high possibility that metallic paper manufacturers distribute or manufacture polyester having a peak at 1,650 cm$^{-1}$ for metallic paper. The peak may have appeared in the process of manufacturing the metallic paper for some reasons.

The inventors of the present invention have repeated trial production and test of metallic paper to improve adhesion to toner images, and have produced metallic paper having a very small peak at 1,650 cm$^{-1}$. The graph (A) in FIG. 1 shows an IR spectrum of the metallic paper according to an embodiment of the present invention prepared by the inventors. The metallic paper having a very small peak at 1,650 cm$^{-1}$ was found to have good adhesion to toner images. The inventors have achieved the present invention by quantifying and adjusting the size of the peak at 1,650 cm$^{-1}$, and provides metallic paper particularly suitable for electrophotography.

Accordingly, the metallic paper for electrophotography according to an embodiment of the present invention comprises a polyester at a surface of the metallic paper. A ratio B/A is 0.90 or less, where A and B respectively represent a peak area A and a peak area B in an infrared spectrum of the metallic paper obtained by an ATR method with a crystal of Ge, an incident angle of 45°, and onetime of reflection. The wavenumber range of peak area A ranges from 1709.586 to 1741.406 cm$^{-1}$, the wavenumber range of peak area B ranges from 1630.519 to 1670.052 cm$^{-1}$, and a baseline wavenumber range of the peaks ranges from 1593.878 to 1850.364 cm$^{-1}$.

The application of the metallic paper of the present disclosure is not particularly limited, but is particularly suitable for electrophotography.

The peak area A is an index of the surface of metallic paper having good adhesion to toner images, and the peak area B is an index of the surface of metallic paper having poor adhesion to toner images. The larger the ratio B/A, the worse the adhesion to toner images. The smaller the ratio B/A, the better the adhesion to toner images. In the present disclosure, the ratio B/A is 0.90 or less, preferably 0.85 or less, and more preferably 0.60 or less.

Figure 2:
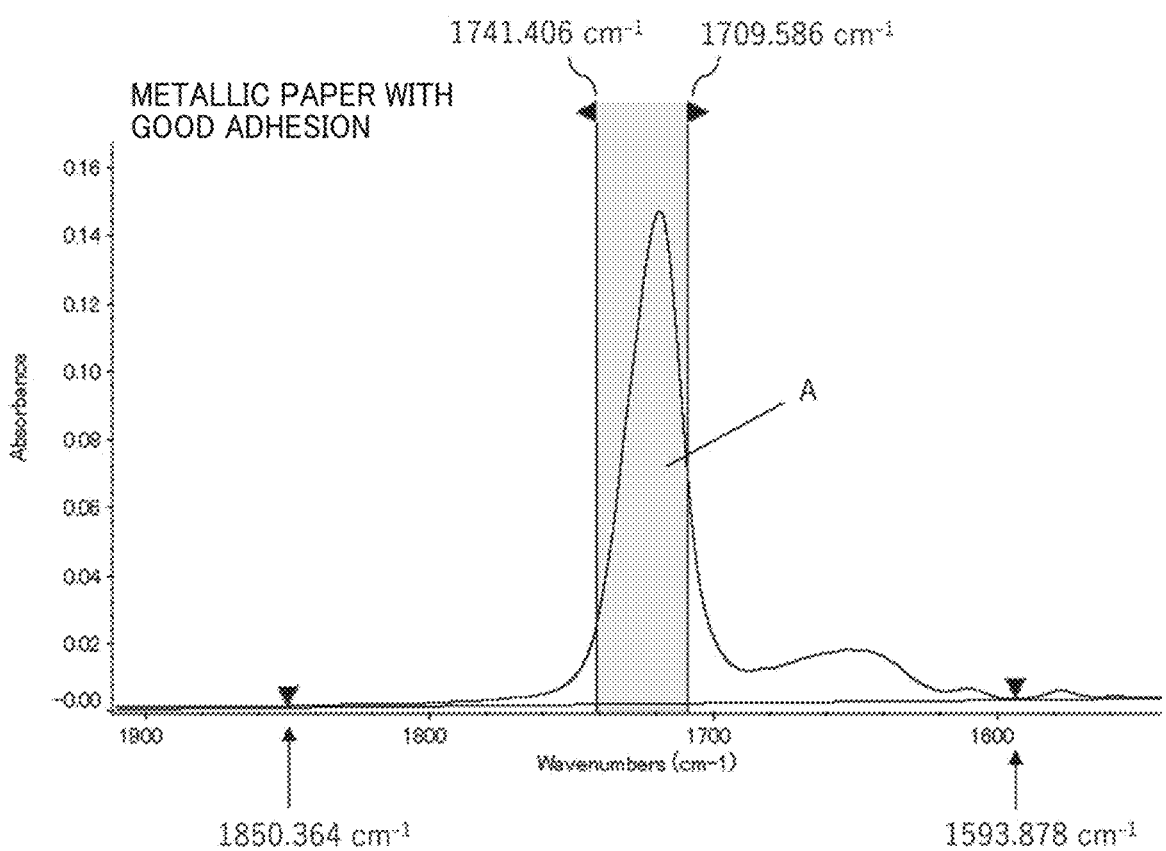
FIG. 2 is an enlarged view of a main part of the graph (A) in FIG. 1.
Figure 3:
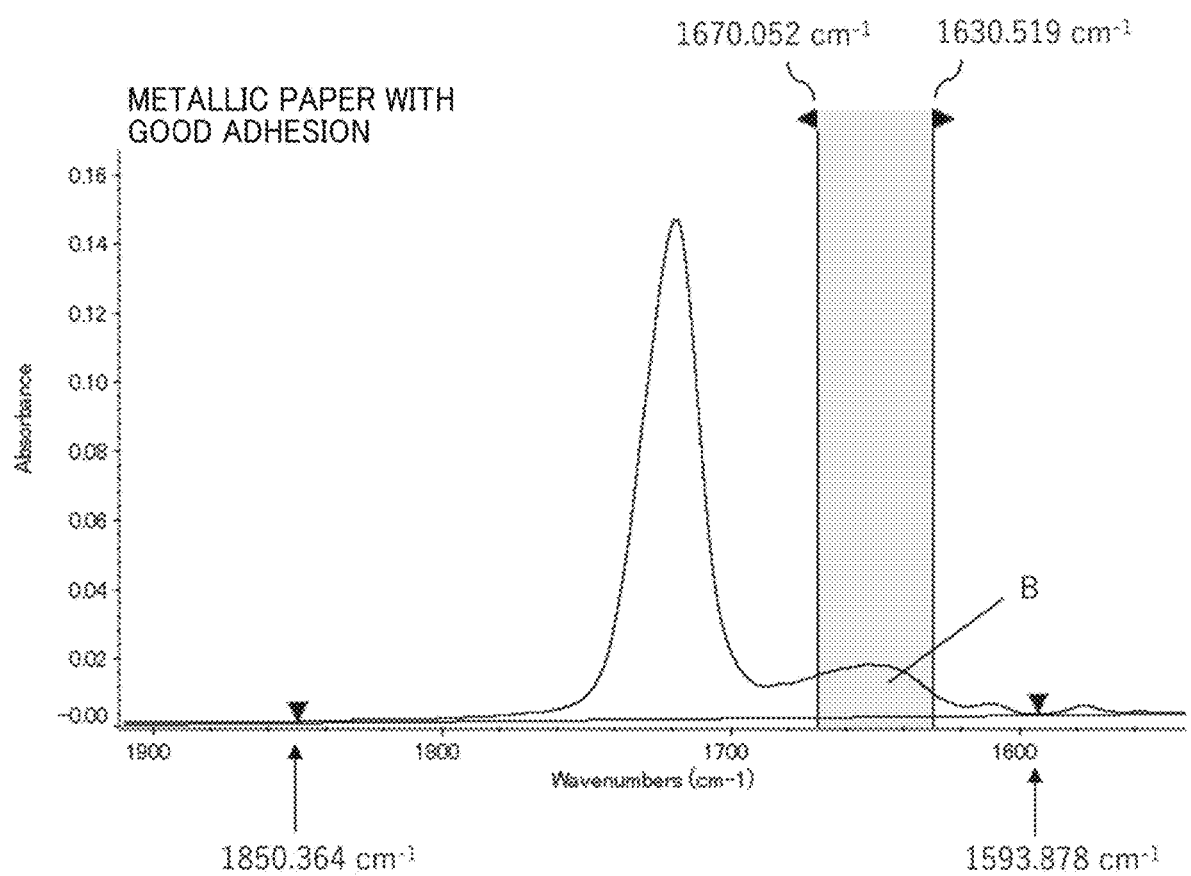
FIG. 3 is an enlarged view of a main part of the graph (A) in FIG. 1.

FIGS. 2 and 3 are graphs showing an IR spectrum of metallic paper according to an embodiment of the present invention. The IR spectra illustrated in FIGS. 2 and 3 are identical. They are magnified views of a main part of the IR spectrum illustrated in FIG. 1. FIG. 2 is for explanation of the peak area A, and FIG. 3 is for explanation of the peak area B.

As shown in FIG. 2, the wavenumber range of peak area A ranges from 1709.586 to 1741.406 cm$^{-1}$. As shown in FIG. 3, the wavenumber range of peak area B ranges from 1630.519 to 1670.052 cm$^{-1}$. As shown in FIGS. 2 and 3, a baseline wavenumber range of the peaks ranges from 1593.878 to 1850.364 cm$^{-1}$.

The peak area A is determined to be 3.065 from FIG. 2. The peak area B is determined to be 0.517 from FIG. 3. Therefore, the metallic paper shown in the graph (A) of FIG. 1 (and in FIGS. 2 and 3) has a ratio B/A of 0.17. Similarly, the metallic paper shown in the graph (B) of FIG. 1 has a ratio B/A of 0.93. The metallic paper according to an embodiment of the present invention shown in the graph (A) of FIG. 1 (and FIGS. 2 and 3) has excellent adhesion to toner images. The comparative metallic paper shown in the graph (B) of FIG. 1 has poor adhesion to toner images.

The B/A can be adjusted to be 0.90 or less by, for example, suitably changing the material of each layer of metallic paper or adjusting the thickness of an adhesive layer.

The metallic paper for electrophotography according to an embodiment of the present invention contains polyester at a surface thereof. The metallic paper of the present embodiment includes a substrate, a layer having metallic luster ("metallic luster layer") over the substrate, and a layer containing polyester ("polyester layer") over the metallic luster layer. The layer containing polyester may be, for example, a polyester film.

One example method for producing the metallic paper of the present disclosure includes: forming a metallic luster layer on a polyester film; and laminating the polyester film on paper. In the laminating, a surface of the polyester film on which the metallic luster layer is formed is bonded to the paper with an adhesive.

The metallic luster layer may contain metals (e.g., aluminum, silver, copper, gold), alloys, aluminum dyed substances, and/or organic metals. In terms of cost, aluminum is preferred. When colored metallic luster is demanded, copper or gold is preferred.

The metallic paper of the present disclosure may contain a polyester film at a surface thereof. The position of the metallic luster layer in the metallic paper can be appropriately changed. The metallic luster layer may include a plurality of metallic luster layers. If the metallic luster layer is disposed close to the surface of the metallic paper, electric discharge is likely to occur during the transfer process of electrophotography, because the metallic luster layer has a low electrical resistance. This may result in deterioration of image quality and may be dangerous. Therefore, preferably, the metallic luster layer is disposed at a position distant to some extent from the surface of the metallic paper.

In the case of forming the metallic luster layer on a polyester film by vapor deposition or sputtering, because the mechanical strength of such a metallic luster layer is low, the metallic luster layer is preferably disposed distant from the surface of the metallic paper. In terms of cost and beauty of light reflection, it is preferable that the metallic paper be obtained by laminating the metallic luster layer on one side of the polyester film and bonding the surface of the metallic luster layer to paper. The metallic luster layer has a higher thermal conductivity than other layers. Therefore, to prevent heat diffusion at the surface of the metallic paper, it is preferable that the metallic luster layer is disposed on a surface of the polyester film which faces the paper.

Accordingly, preferably, the metallic luster layer is formed on a substrate such as paper, and the polyester film is further laminated on the metallic luster layer. The metallic luster layer is preferably distant from the surface of the metallic paper by 10 to 100 μm, more preferably 12 to 90 μm, in the direction of lamination. When the distance of the metallic luster layer from the surface of the metallic paper is 10 μm or more, the occurrence of electric discharge during the transfer process can be suppressed. When the distance of the metallic luster layer from the surface of the metallic paper is 100 μm or less, beautiful metallic luster is prevented from being impaired.

The metallic luster layer can be formed by, for example, vapor deposition, vacuum processing by sputtering, electroless plating, coating with metallic ink, or adhesion of a metal or alloy film. Among these, vacuum processing and coating with metallic ink are preferred for uniformity of the metallic luster film and cost.

The thickness of the metallic luster layer can be suitably selected depending on the demanded degree of metallic luster of the metallic paper and the cost, but is preferably from 0.02 to 2.00 μm, more preferably from 0.03 to 1.00 μm, and most preferably from 0.03 to 0.50 μm. The thickness of the metallic luster layer may be either uniform or non-uniform. In the latter case, the film thickness of the metallic luster layer may be changed by patterning or shaping the metallic luster layer of the metallic paper.

The thickness of the polyester layer (e.g., polyester film) can be suitably selected depending on handleability, cost, and the demanded degree of metallic tone, but is preferably from 10 to 100 μm, more preferably from 12 to 100 μm, much more preferably from 12 to 80 μm, and particularly preferably from 20 to 80 μm. When the thickness is 10 μm or more, it becomes easy to suppress the occurrence of electric discharge in the transfer process. When the thickness is 100 μm or less, a decrease in light reflection is suppressed and a cost increase is suppressed. In addition to the above advantages, when the thickness is from 10 to 100 μm, processing and post-processing (e.g., bending) to the metallic paper do not become difficult.

Since the metallic paper of the present disclosure contains polyester at the surface, the metallic paper itself has good adhesion to polyester or styrene-acryl contained in toner matrix. Therefore, the metallic paper provides printed matter with high degree of adhesion to toner images. The metallic paper of the present disclosure may have an anchor coat layer for antistatic purpose and improvement of adhesion. The thickness of the anchor coat layer is preferably from 0.1 to 15.0 μm, more preferably from 0.2 to 10.0 μm, and even more preferably from 0.5 to 9.0 μm.

The metallic paper of the present invention may be produced, for example, by bonding a polyester film having a metallic luster layer to paper with an adhesive. The adhesive between the polyester film having a metallic luster layer and the paper may be a pressure-sensitive adhesive that has flexibility and adhesion. Specific examples of the pressure-sensitive adhesive include, but are not limited to, vinyl acetate, ethylene-vinyl acetate copolymer resin, and acrylic resin. Acrylic pressure-sensitive adhesives are preferred for their heat stability.

The thickness of the adhesive layer is preferably from 1 to 15 μm, more preferably from 2 to 10 μm. When the thickness is within the above range, the adhesive is prevented from having difficulty in following surface irregularities of the paper, and a decrease of the adhesive strength is prevented. In addition, a cost increase is suppressed, and a decrease of mechanical strength of the metallic paper is suppressed. The thermal conductivity of the metallic paper is greatly affected by the thickness of the adhesive layer. The thicker the adhesive layer, the more easily the thermal conductivity of the metallic paper decreases. When the thickness of the adhesive layer is within the above range, it becomes easier to keep the thermal conductivity of the metallic paper in a desired range and to improve the adhesion to toner.

Specific examples of the paper (i.e., substrate) used for the metallic paper of the present disclosure include, but are not limited to, plain paper and coated paper. For the adhesion to the polyester film having a metallic luster layer and the reflectance of the metallic paper, coated paper having a smooth surface is preferred. For application of the metallic paper, it is preferable that the metallic paper have a certain degree of thickness. Specifically, coated paper having a paper density of from 100 to 350 GSM is preferred.

The metallic paper of the present disclosure has a thermal conductivity of 0.34 W/m·K or less, more preferably from 0.23 to 0.33 W/m·K.

A typical electrophotographic image forming method includes the processes of: transferring an unfixed toner image onto one side of a paper sheet; and allowing the paper sheet to pass through between a fixing belt (i.e., fixing member) and a fixing opposed roller (i.e., pressure member) with the fixing belt being heated and the toner image facing the fixing belt, to fix the toner image on the paper sheet.

Metallic paper is often thicker than ordinary paper. When a white toner layer is formed as the lowermost layer of a toner image, the toner image is thicker than a normal image. Therefore, when the thermal conductivity of the metallic paper is high, the heat from the fixing belt may diffuse to the entire metallic paper, and the adhesion between the surface of the metallic paper and the toner may be lowered. On the other hand, when the thermal conductivity of the metallic paper is 0.34 W/m·K or less, the heat from the fixing belt is suppressed from diffusing to the entire metallic paper, and the adhesion to toner images is improved.

The thermal conductivity of the metallic paper of the present disclosure is measured by the hot wire method. The hot wire method is a simple method for measuring the thermal conductivity of metallic paper with good reproducibility. In the present disclosure, the thermal conductivity of metallic paper is measured by the hot wire method using a quick thermal conductivity meter QTM-500 (product of Kyoto Electronics Manufacturing Co., Ltd.) in an environment of 23±1° C. and 50±5%. In a measurement using QTM-500, metallic paper is placed on a reference plate having a known thermal conductivity with the metallic luster surface facing upward, and the device probe is placed on the metallic paper. The thermal conductivity is determined from the measurement results obtained using quartz glass, silicon rubber, and silicon sponge rubber as the reference plate.

Embodiments of the present invention further provide printed matter comprising the metallic paper of the present disclosure and a toner image formed thereon. The printed matter of the present disclosure provides a beautiful toner image with excellent adhesiveness to the metallic paper.

Embodiments of the present invention further provide an image forming method using the metallic paper of the present disclosure. The image forming method of the present disclosure includes: an electrostatic latent image forming process for forming an electrostatic latent image on an electrostatic latent image bearer; a developing process for developing the electrostatic latent image on the electrostatic latent image bearer with toner to form a toner image; a transfer process for transferring the toner image formed on the electrostatic latent image bearer onto a recording medium; and a fixing process for fixing the toner image on the recording medium, where the recording medium comprises the metallic paper of the present disclosure. The image forming method of the present disclosure is capable of forming a beautiful toner image with excellent adhesiveness to metallic paper.

Preferably, the image forming method of the present disclosure includes the processes of: forming a white toner image as the lowermost layer on the metallic paper; and forming a colored toner image on the white toner image. Specifically, preferably; the developing process includes forming a white toner image and a colored toner image; the transfer process includes transferring the white toner image onto the metallic paper, then transferring the colored toner image onto the white toner image, to make the white toner image the lowermost layer; the fixing process includes allowing the metallic paper to pass through between a fixing member and an opposed member opposed to the fixing member, with the fixing member being heated and a surface of the metallic paper having the white toner image and the colored toner image thereon facing the fixing member, to fix the white toner image and the colored toner image on the metallic paper. This image forming method is capable of forming a more beautiful toner image with excellent adhesiveness to metallic paper.

Next, an image forming apparatus 1 using the image forming method of the present disclosure is described below with reference to FIG. 4.

Image Reader

An image reader 11 optically reads an image on a sheet to generate image information. Specifically, the image reader 1*l* emits light to the sheet and receives the reflected light with a reading sensor, such as a charge-coupled device (CCD) and a contact image sensor (CIS). The image information refers to information of an image to be formed on a recording medium (e.g., sheet) and represented by electrically color-separated image signals indicating each color of red (R), green (G), and blue (B).

Figure 4:
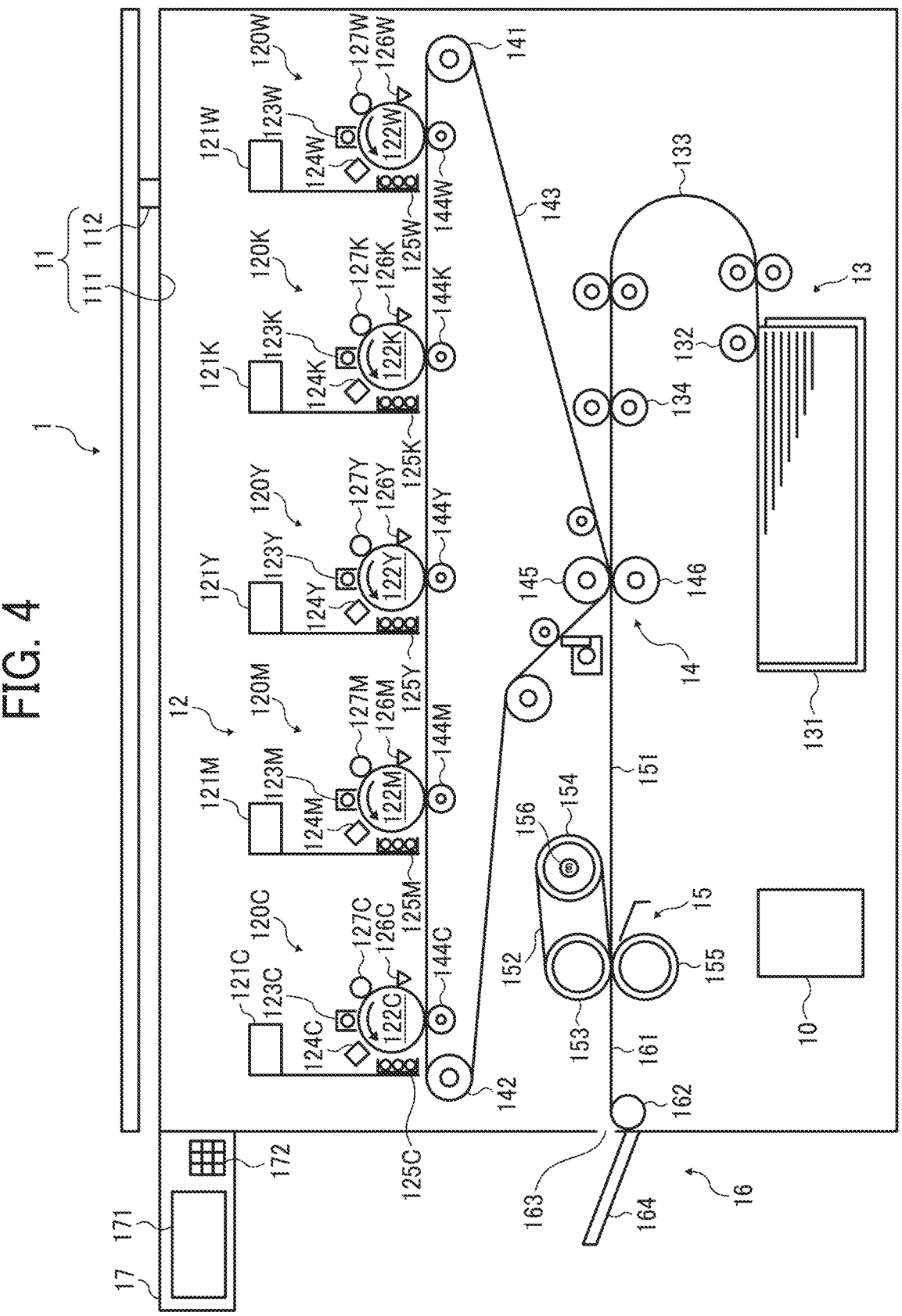
FIG. 4 is a schematic view of an image forming apparatus according to an embodiment of the present invention.

As illustrated in FIG. 4, the image reader 11 includes a contact glass 111 and a reading sensor 112. On the contact glass 111, the sheet having an image is to be placed. The reading sensor 112 reads image information of the image on the sheet placed on the contact glass 111.

Image Forming Device

An image forming device 12 attaches toner to a surface of an intermediate transfer belt 143 of a transfer device 14, based on the image information read by the image reader 11 or image information received by a network I/F, to form a toner image.

The image forming device 12 includes: an image forming unit 120C that forms a toner image using a cyan (C) toner; an image forming unit 120M that forms a toner image using a magenta (M) toner, an image forming unit 120Y that forms a toner image using yellow (Y) toner; an image forming unit 120K that forms a toner image using black (K) toner; and an image forming unit 120W that forms a toner image using white (W) toner.

Hereinafter, one or more of C toner, M toner, Y toner, and K toner will be referred to as "colored toner". "color toner", or "process color toner". Each colored toner is composed of chargeable resin particles containing a colorant such as pigment and dye.

The white toner is composed of chargeable resin particles containing a white colorant such as a white pigment.

The image forming device 12 may further include an image forming unit that forms a toner image using a transparent clear toner or a toner with a color other than C, M, Y, and K.

Hereinafter, any of the image forming unit 120C, the image forming unit 120M, the image forming unit 120Y, the image forming unit 120K, and the image forming unit 120W will be referred to as "image forming unit 120".

The image forming unit 120C includes a toner supply unit 121C, a photoconductor drum 122C, a charger 123C, an irradiator 124C, a developing unit 125C, an electric charge remover 126C, and a cleaner 127C.

The toner supply unit 121C accommodates the C toner and supplies the C toner to the developing unit 125C. The toner accommodated in the toner supply unit 121C is supplied to the developing unit 125C in a predetermined amount as a conveying screw in the toner supply unit 121C drives. The toner supply unit 121C may also be referred to as a "developer accommodating unit 121C".

A surface of the photoconductor drum 122C is uniformly charged by the charger 123C. The irradiator 124C forms an electrostatic latent image on the surface based on image information received from a controller 10. The developing unit 125C then attaches toner to the surface of the photoconductor drum 122C on which the electrostatic latent image is formed to form a toner image. The photoconductor drum 122C is in contact with the intermediate transfer belt 143 and rotates in the same direction as the moving direction of the intermediate transfer belt 143 at the contact point with the intermediate transfer belt 143.

The charger 123C uniformly charges the surface of the photoconductor drum 122C.

The irradiator 124C irradiates the surface of the photoconductor drum 122C charged by the charger 123C with light based on a halftone dot area ratio of cyan color determined by the controller 10, to form an electrostatic latent image.

The developing unit 125C attaches the C toner accommodated in the developer accommodating unit 121C to the electrostatic latent image formed on the surface of the photoconductor drum 122C by the irradiator 124C, to form a toner image.

The electric charge remover 126C removes charge on the surface of the photoconductor drum 122C after the image has been transferred onto the intermediate transfer belt 143. The cleaner 127C removes, after the image transfer, residual toner remaining on the surface of the photoconductor drum 122C from which charge has been removed by the electric charge remover 126C.

The image forming unit 120M includes a developer accommodating unit 121M, a photoconductor drum 122M, a charger 123M, an irradiator 124M, a developing unit 125M, an electric charge remover 126M, and a cleaner 127M. The developer accommodating unit 121M accommodates magenta (M) toner. Since the photoconductor drum 122M, the charger 123M, the irradiator 124M, the developing unit 125M, the electric charge remover 126M, and the cleaner 127M have the same functions as the photoconductor drum 122C, the charger 123C, the irradiator 124C, the developing unit 125C, the electric charge remover 126C, and the cleaner 127C, respectively, detailed descriptions thereof are omitted.

The image forming unit 120Y includes a developer accommodating unit 121Y, a photoconductor drum 122Y, a charger 123Y, an irradiator 124Y, a developing unit 125Y, an electric charge remover 126Y, and a cleaner 127Y The developer accommodating unit 121Y accommodates yellow (Y) toner. Since the photoconductor drum 122Y, the charger 123Y, the irradiator 124Y, the developing unit 125Y, the electric charge remover 126Y, and the cleaner 127Y have the same functions as the photoconductor drum 122C, the charger 123C, the irradiator 124C, the developing unit 125C, the electric charge remover 126C, and the cleaner 127C, respectively, detailed descriptions thereof are omitted.

The image forming unit 120K includes a developer accommodating unit 121K, a photoconductor drum 122K, a charger 123K, an irradiator 124K, a developing unit 125K, an electric charge remover 126K, and a cleaner 127K. The developer accommodating unit 121K accommodates black (K) toner. Since the photoconductor drum 122K, the charger 123K, the irradiator 124K, the developing unit 125K, the electric charge remover 126K, and the cleaner 127K have the same functions as the photoconductor drum 122C, the charger 123C, the irradiator 124C, the developing unit 125C, the electric charge remover 126C, and the cleaner 127C, respectively, detailed descriptions thereof are omitted.

The image forming unit 120W includes a developer accommodating unit 121W, a photoconductor drum 122W, a charger 123W, an irradiator 124W, a developing unit 125W, an electric charge remover 126W, and a cleaner 127W. The developer accommodating unit 121W accommodates white (W) toner. Since the photoconductor drum 122W, the charger 123W, the irradiator 124W, the developing unit 125W, the electric charge remover 126W, and the cleaner 127W have the same functions as the photoconductor drum 122C, the charger 123C, the irradiator 124C, the developing unit 125C, the electric charge remover 126C, and the cleaner 127C, respectively, detailed descriptions thereof are omitted.

Hereinafter, any of the developer accommodating unit 121C, the developer accommodating unit 121M, the developer accommodating unit 121Y, the developer accommodating unit 121K, and the developer accommodating unit 121W may be referred to as a "developer accommodating unit 121".

Further, any of the photoconductor drum 122C, the photoconductor drum 122M, the photoconductor drum 122Y, the photoconductor drum 122K, and the photoconductor drum 122W may be referred to as a "photoconductor drum 122".

Further, any of the charger 123C, the charger 123M, the charger 123Y, the charger 123K, and the charger 123W may be referred to as a "charger 123".

Further, any of the irradiator 124C, the irradiator 124M, the irradiator 124Y, the irradiator 124K, and the irradiator 124W may be referred to as an "irradiator 124".

Further, any of the developing unit 125C, the developing unit 125M, the developing unit 125Y, the developing unit 125K, and the developing unit 125W may be referred to as a "developing unit 125".

Further, any of the electric charge remover 126C, the electric charge remover 126M, the electric charge remover 126Y, the electric charge remover 126K, and the electric charge remover 126W may be referred to as an "electric charge remover 126".

Further, any of the cleaner 127C, the cleaner 127M, the cleaner 127Y, the cleaner 127K, and the cleaner 127W may be referred to as a "cleaner 127".

There is no limit in the order of C, M, Y, and K toners to be transferred onto the intermediate transfer belt 143, as long as the w % bite toner is transferred last. Therefore, the image forming unit 120W is disposed most downstream.

Sheet Feeder

A sheet feeder 13 supplies a sheet to the transfer device 14. The sheet feeder 13 includes a sheet accommodating unit 131, a sheet feeding roller 132, a sheet feeding belt 133, and a registration roller pair 134.

The sheet accommodating unit 131 accommodates sheets serving as recording media. The sheet feeding roller 132 rotates so as to move the sheet accommodated in the sheet accommodating unit 131 toward the sheet feeding belt 133. The sheet feeding roller 132 takes out the sheet on the top of the sheets accommodated in the sheet accommodating unit 131, one by one, and places the sheet on the sheet feeding belt 133.

The sheet feeding belt 133 conveys the sheet picked up by the sheet feeding roller 132 to the transfer device 14. The registration roller pair 134 feeds the sheet conveyed by the sheet feeding belt 133 in synchronization with entry of the portion on the intermediate transfer belt 143 where the toner image is formed to the transfer device 14.

Transfer Device

The transfer device 14 primarily transfers the image formed on the photoconductor drum 122 by the image forming device 12 onto the intermediate transfer belt 143, and secondarily transfers the image on the intermediate transfer belt 143 onto a sheet.

The transfer device 14 includes a drive roller 141, a driven roller 142, the intermediate transfer belt 143, primary transfer rollers 144C, 144M, 144Y. 144K, and 144W, a secondary transfer roller 145, and a secondary opposed roller 146.

The drive roller 141 hangs the intermediate transfer belt 143 together with the driven roller 142. As the drive roller 141 drives to rotate, the intermediate transfer belt 143 is moved. The driven roller 142 hangs the intermediate transfer belt 143 together with the drive roller 141. The driven roller 142 rotates as the drive roller 141 rotates and the intermediate transfer belt 143 moves.

The intermediate transfer belt 143 is stretched between the drive roller 141 and the driven roller 142, and moves while being in contact with the photoconductor drum 122 as the drive roller 141 rotates. As the intermediate transfer belt 143 moves while being in contact with the photoconductor drum 122, the image formed on the photoconductor drum 122 gets transferred onto a surface of the intermediate transfer belt 143.

The primary transfer rollers 144C. 144M, 144Y, 144K, and 144W are disposed facing the photoconductor drums 122C, 122M, 122Y, 122K, and 122W, respectively, with the intermediate transfer belt 143 sandwiched therebetween, and rotate so as to move the intermediate transfer belt 143.

The secondary transfer roller 145 rotates so as to sandwich the intermediate transfer belt 143 and the sheet being between the secondary transfer roller 145 and the secondary opposed roller 146. The secondary opposed roller 146 rotates so as to sandwich the intermediate transfer belt 143 and the sheet between the secondary transfer roller 145 and the secondary opposed roller 146.

To produce a printed matter in which a colored toner image is formed on a white toner image, the white toner image is formed as the lowermost layer on a metallic paper sheet, and the colored toner image is transferred onto the white toner image.

Fixing Device

A fixing device 15 fixes the toner having been transferred onto the sheet by the transfer device 14. Fixing is to make resin components of the toner to adhere to the sheet by simultaneously applying heat and pressure to the toner. As the toner having been transferred onto the sheet by the transfer device 14 gets fixed, the state of the toner on the sheet becomes stable.

The fixing device 15 includes a conveyance belt 151, a fixing belt 152, a fixing roller 153, a fixing belt conveyance roller 154, a fixing opposed roller 155, and a heat generator 156. The fixing belt 152 and the fixing roller 153 are examples of the above-described fixing members, and the fixing opposed roller 155 is an example of the above-described opposed member.

The conveyance belt 151 conveys the sheet onto which the toner has been transferred by the transfer device 14 toward the fixing roller 153 and the fixing opposed roller 155. The fixing belt 152 is stretched between the fixing roller 153 and the fixing belt conveyance roller 154, and is moved as these rollers rotate. The fixing roller 153 heats and pressurizes the sheet sandwiched between the fixing roller 153 and the fixing opposed roller 155, having been conveyed by the conveyance belt 151.

The fixing belt 152 is stretched between the fixing belt conveyance roller 154 and the fixing roller 153. The fixing belt 152 is moved as the fixing belt conveyance roller 154 rotates. The fixing opposed roller 155 is disposed opposed to the fixing roller 153. The fixing opposed roller 155 and the fixing roller 153 sandwich the sheet conveyed therebetween.

The heat generator 156 is disposed inside the fixing belt conveyance roller 154 and configured to generate heat. As the heat generator 156 generates heat, the temperature of the fixing belt conveyance roller 154 rises to heat the fixing belt 152. As the heated fixing belt 152 rotates, the sheet gets heated.

In FIG. 4, the heat generator 156 is disposed inside the fixing belt conveyance roller 154. However, the position of the heat generator 156 is not limited thereto as long as the fixing belt 152 can be heated. For example, in a case in which the heat generator 156 is an induction heater ("IH heater"), the heat generator 156 may be disposed outside the fixing belt conveyance roller 154 and the fixing belt 152. Alternatively, the heat generator 156 may be disposed inside the fixing roller 153, without employing the fixing belt 152. Alternatively, the heat generator 156 may be disposed inside or outside the fixing opposed roller 155.

To produce a printed matter in which a colored toner image is formed on a white toner image, a metallic paper sheet is allowed to pass through between the fixing belt 152 and the fixing opposed roller 155, with the surface onto which the white toner image and the colored toner image have been transferred facing the fixing belt 152, to fix the white toner image and the colored toner image.

Sheet Ejector

A sheet ejector 16 ejects, from the image forming apparatus 1, the sheet on which the toner has been fixed by the fixing device 15. The sheet ejector 16 includes a sheet ejection belt 161, a sheet ejection roller 162, a sheet ejection port 163, and a sheet ejection tray 164.

The sheet ejection belt 161 conveys the sheet on which the toner has been fixed by the fixing device 15 toward the sheet ejection port 163. The sheet ejection roller 162 ejects the sheet conveyed by the sheet ejection belt 161 from the sheet ejection port 163 onto the sheet ejection tray 164. The sheet ejection tray 164 accommodates the sheets ejected by the sheet ejection roller 162.

Display Operation Unit

A display operation unit 17 has a panel display unit 171 and an operation unit 172. The panel display unit 171 displays set values, selection screens, and the like. The panel display unit 171 may be a touch panel that receives input from an operator. The operation unit 172 includes a numeric keypad that accepts various conditions related to image formation, a start key that accepts a copying start instruction, etc., each of which is used for the input operation by the operator.

EXAMPLES

Further understanding can be obtained by reference to certain specific examples which are provided herein for the purpose of illustration only and are not intended to be limiting.

Example 1 and Comparative Example 1

A toner image was formed on a sheet of metallic paper (SP-714, product of Gojo Paper Mfg. Co., Ltd.) containing polyester at a surface thereof. The surface of this metallic paper was subjected to a measurement by the ATR method (with a crystal of Ge, an incident angle of 45°, and one time of reflection). As a result, an IR spectrum illustrated in the graph (A) of FIG. 1 was obtained, and the ratio B/A was 0.17.

In addition, a toner image was formed on a sheet of metallic paper (SP-730, product of Gojo Paper Mfg. Co., Ltd.) containing polyester at a surface thereof. The surface of this metallic paper was subjected to a measurement by the ATR method. As a result, an IR spectrum illustrated in the graph (B) of FIG. 1 was obtained, and the ratio B/A was 0.93.

The thermal conductivity of each metallic paper was measured using a quick thermal conductivity meter QTM-500 (product of Kyoto Electronics Manufacturing Co., Ltd.) in an environment of 23±0.1° C. and 50±5%. As the reference plate, quartz glass, silicon rubber, and silicon sponge rubber were used. The thermal conductivity of the metallic paper of Example 1 was 0.245 W/m·K. The thermal conductivity of the metallic paper of Comparative Example 1 was 0.341 W/m·K.

The layer structure of each metallic paper is as presented in Table 1. The layer structure of the metallic paper was confirmed by preparing a cross-section of the metallic paper using a cross-section sample preparation device IB-19520CCP (product of JEOL Ltd.) and observing the cross-section with an electron microscope to measure the thickness of each layer.

Next, a toner image was formed on each metallic paper. A modified machine of a color production printer Pro C7200S (product of Ricoh Co., Ltd.) was used as an image forming apparatus. Normally, when trying to form an image on thick paper such as metallic paper, the paper sensor of Pro C7200S works to slow down the printing speed and increase the amount of heat supplied to the toner image ("medium speed mode"). On the other hand, the modified machine of Pro C7200S has been modified such that the signal of the paper sensor is blocked, to be able to perform printing at a normal printing speed even when an image is formed on metallic paper ("high-speed mode").

An image to be formed was an image in which a white solid image and a magenta solid image were superimposed on one another. Specifically, the white solid image was formed on the metallic paper, and the magenta solid image was formed on the white solid image. Thus, printed matter was obtained, comprising the metallic paper and the toner image formed thereon.

Next, the adhesion of the toner was evaluated. The adhesion of the toner was evaluated using a drawing tester (Type AD-2110, product of Ueshima Seisakusho Co., Ltd.). The load of the drawing tester was 50 g, and the moving stage was fixed. The toner image was rubbed 100 times at the same portion, and then the state of toner peeling was visually observed to evaluate fixability of the toner image. The evaluation criteria are as follows. "A" is very good (practical level), "B" is good (practical level). "C" is poor (NG level), and "D" is very poor (NG level).

Evaluation Criteria
  A: No toner peeling is observed.
  B: Toner peeling is slightly observed, but the metallic paper is not exposed.
  C: A part of the metallic paper is exposed.
  D: The toner image is peeled off like a film, and the metallic paper is completely exposed.

The metallic paper of Example 1 having a B/A of 0.17 was found to have very excellent adhesion to the toner, and a very clear image was obtained. By contrast, the metallic paper of Comparative Example 1 having a B/A of 0.93 was found to have a portion where the adhesion to the toner was slightly weak.

Next, the signal of the paper sensor was normalized to form an image in which a white solid image, a cyan solid image, a magenta solid image, a yellow solid image, and a black solid image were superimposed on one another. As a result, the metallic paper of Example 1 having a B/A of 0.17 was found to have very excellent adhesion to the toner, and a very clear image was obtained. By contrast, the toner image formed on the metallic paper of Comparative Example 1 having a B/A of 0.93 was easily peeled off when the surface thereof was rubbed.

Examples 2 to 4 and Comparative Example 2

A toner image was formed on each metallic paper presented in Table 1 in the same manner as in Example 1, and the adhesion between the toner image and each metallic paper was evaluated. The results are presented in Table 1.

Table 1 shows the evaluation results for adhesion of a toner image in which a white solid image, a cyan solid image, a magenta solid image, a yellow solid image, and a black solid image were superimposed on one another as in Example 1. Formation and evaluation of the toner image was performed in each of the medium-speed mode and the high-speed mode.

TABLE 1

| | Substrate | | Adhesive Layer | Metallic Luster Layer | | Polyester Layer | | Thermal | Adhesion between Toner linage and Metallic Paper | |
|---|---|---|---|---|---|---|---|---|---|---|
| | Type | Thickness (μm) | Thickness (μm) | Layer Type | Thickness (μm) | B/A | Conductivity (W/m · K) | Medium-speed Mode | High-speed Mode |
| Example 1 | Coated Paper | 350 | 5.5 | Aluminum | 26 | 0.2 | 0.245 | A | A |
| Example 2 | Coated Paper | 350 | 1.1 | Aluminum | 70 | 0 | 0.322 | A | A |
| Example 3 | Coated Paper | 380 | 7.0 | Aluminum | 50 | 0.4 | 0.373 | A | B |
| Example 4 | Coated Paper | 370 | 2.5 | Aluminum | 50 | 0.6 | 0.288 | B | B |
| Comparative Example 1 | Coated Paper | 370 | 0.4 | Aluminum | 18 | 0.9 | 0.341 | C | D |
| Comparative Example 2 | Coated Paper | 370 | 0.6 | Aluminum | 85 | 1.2 | 0.343 | D | D |

As described above, according to embodiments of the present invention, metallic paper is provided that has excellent adhesion to images formed by electrophotography.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. Metallic paper for electrophotography, comprising:
a substrate:
a metallic luster layer over the substrate; and
a polyester at a surface of the metallic paper,
wherein a ratio B/A is 0.90 or less, where A and B respectively represent a peak area A and a peak area B in an infrared spectrum of the metallic paper obtained by an ATR method with a crystal of Ge, an incident angle of 45°, and one time of reflection,
wherein:
a wavenumber range of the peak area A ranges from 1709.586 to 1741.406 $cm^{-1}$,
a wavenumber range of the peak area B ranges from 1630.519 to 1670.052 $cm^{-1}$, and
a baseline wavenumber range of the peaks ranges from 1593.878 to 1850.364 $cm^{-1}$.

2. The metallic paper of claim 1, wherein the metallic paper has a thermal conductivity of 0.34 W/m·K or less measured by a hot wire method.

3. The metallic paper of claim 1, further comprising:
a polyester layer over the metallic luster layer, the polyester layer comprising the polyester.

4. The metallic paper of claim 3, wherein the polyester layer is a polyester film.

5. The metallic paper of claim 3, wherein the metallic luster layer is distant from the surface of the metallic paper by 10 to 100 µm in a direction of lamination.

6. The metallic paper of claim 3, further comprising an adhesive layer between the substrate and the metallic luster layer, the adhesive layer having a thickness of from 1 to 15 µm.

7. The metallic paper of claim 3, wherein the polyester layer has a thickness of from 20 to 80 µm.

8. Printed matter comprising:
the metallic paper of claim 1; and
a. toner image on the metallic paper.

9. An image forming method comprising:
forming an electrostatic latent image on an electrostatic latent image bearer;
developing the electrostatic latent image with a toner to form a toner image;
transferring the toner image from the electrostatic latent image onto the metallic paper of claim 1; and
fixing the toner image on the metallic paper.

10. The image forming method of claim 9, wherein:
the developing includes forming a white toner image and a colored toner image,
the transferring includes transferring the white toner image onto the metallic paper and transferring the colored toner image onto the white toner image, to make the white toner image a lowermost layer, and
the fixing includes allowing the metallic paper to pass through between a fixing member and an opposed member opposed to the fixing member, with the fixing member being heated and a surface of the metallic paper having the white toner image and the colored toner image thereon facing the fixing member, to fix the white toner image and the colored toner image on the metallic paper.

11. The metallic paper of claim 1, wherein the ratio B/A is 0.85 or less.

12. The metallic paper of claim 1, wherein the ratio B/A is 0.60 or less.

13. The metallic paper of claim 1, wherein the ratio B/A is from 0.17 to 0.90.

14. Metallic paper for electrophotography, comprising:
a substrate;
an adhesive layer having a thickness of from 1 to 15 µm over the substrate,
a metallic luster layer comprising a metal, over the adhesive layer, and
a polyester layer having a thickness of from 20 to 80 µm over the metallic luster layer,
wherein a ratio B/A is 0.90 or less, where A and B respectively represent a peak area A and a peak area B in an infrared spectrum of the metallic paper obtained by an ATR method with a crystal of Ge, an incident angle of 45°, and one time of reflection,
wherein:
a wavenumber range of the peak area A ranges from 1709.586 to 1741.406 $cm^{-1}$,
a waven tuber range of the peak area B ranges from 1630.519 to 1670.052 $cm^{-1}$, and
a baseline wavenumber range of the peaks ranges from 1593.878 to 1850.364 $cm^{-1}$.

15. The metallic paper of claim 14, wherein the ratio B/A is 0.85 or less.

16. The metallic paper of claim 14, wherein the ratio B/A is 0.60 or less.

17. The metallic paper of claim 14, wherein the ratio B/A is from 0.17 to 0.90.

* * * * *